(12) United States Patent
Murray

(10) Patent No.: US 8,612,648 B1
(45) Date of Patent: Dec. 17, 2013

(54) METHOD AND APPARATUS FOR IMPLEMENTING QUALITY OF SERVICE IN A DATA BUS INTERFACE

(75) Inventor: James J. Murray, Los Gatos, CA (US)

(73) Assignee: Xilinx, Inc., San Jose, CA (US)

( * ) Notice: Subject to any disclaimer, the term of this patent is extended or adjusted under 35 U.S.C. 154(b) by 272 days.

(21) Appl. No.: 12/839,011

(22) Filed: Jul. 19, 2010

(51) Int. Cl.
*G06F 13/38* (2006.01)

(52) U.S. Cl.
USPC .............................................. 710/52; 710/14

(58) Field of Classification Search
USPC ........................................................ 710/14
See application file for complete search history.

(56) References Cited

U.S. PATENT DOCUMENTS

| | | | | |
|---|---|---|---|---|
| 5,481,540 | A * | 1/1996 | Huang | 370/401 |
| 5,796,943 | A * | 8/1998 | Fujioka | 726/19 |
| 6,563,836 | B1 | 5/2003 | Capps et al. | |
| 7,216,328 | B2 | 5/2007 | Hwang et al. | |
| 7,352,764 | B1 * | 4/2008 | Park et al. | 370/412 |
| 2001/0047437 | A1 * | 11/2001 | Kawashima | 710/5 |
| 2002/0023186 | A1 * | 2/2002 | Kim | 710/244 |
| 2002/0083063 | A1 * | 6/2002 | Egolf | 707/100 |
| 2002/0126541 | A1 * | 9/2002 | Spiegel et al. | 365/189.07 |
| 2004/0139441 | A1 * | 7/2004 | Kaburaki et al. | 718/107 |
| 2006/0053266 | A1 * | 3/2006 | Nakagawa et al. | 711/170 |
| 2008/0059672 | A1 * | 3/2008 | Irish et al. | 710/116 |
| 2008/0291827 | A1 * | 11/2008 | Xiong et al. | 370/230.1 |
| 2010/0023949 | A1 * | 1/2010 | Jackson | 718/104 |

OTHER PUBLICATIONS

Dehaven, Keith, *Extensible Processing Platform Ideal Solution for a Wide Range of Embedded Systems*, WP369 (v1.0), Apr. 27, 2010, pp. 1-11, available from Xilinx, Inc., San Jose, California, USA.
Nass, Rich, "Xilinx puts ARM core into its FPGAs," *EE Times*, Apr. 27, 2010, pp. 1-2, www.eetimes.com.
Taylor, Brad et al., *28nm Generation Programmable Families*, Aug. 8, 2010, pp. 1-25, available from Xilinx, Inc., San Jose, California, USA.

* cited by examiner

*Primary Examiner* — Henry Tsai
*Assistant Examiner* — John Roche
(74) *Attorney, Agent, or Firm* — LeRoy D. Maunu

(57) ABSTRACT

In one embodiment, a method for implementing quality of service (QOS) processing in a data bus interface. Each input read/write command is stored in a first-in-first-out queue. Each input read/write command includes a respective QOS value. In response to an input first read/write command having a QOS value higher than the QOS value of the read/write command at a head of the first-in-first-out queue, the QOS value of each of a first number of read/write commands is increased as each read/write command is removed from the head of the first-in-first-out queue.

17 Claims, 5 Drawing Sheets

METHOD AND APPARATUS FOR IMPLEMENTING QUALITY OF SERVICE IN A DATA BUS INTERFACE

FIELD OF THE INVENTION

The disclosed embodiments generally relate to data bus communication.

BACKGROUND

Programmable integrated circuits (ICs) may be programmed by a user to perform specified logic functions. One type of programmable logic device, known as a field programmable gate array (FPGA), is very popular because of a superior combination of capacity, flexibility, time-to-market, and cost. Programmable ICs provide the flexible hardware solutions ideal for high performance parallel computing required for advanced digital communications and video applications. For many complex applications, there has been a recent trend to implement a portion of the design in software and a portion of the design in programmable logic. Many manufacturers, such as Xilinx, Inc., include embedded processor systems in a number of programmable integrated circuits. These embedded processor systems offer an ideal combination to meet both the software and hardware programmable needs. Embedded processor systems often include operating memory, software instruction storage, input/output, and other components of a computer system. These systems are referred to as system on chip (SOC) solutions. In these systems, designers may implement complex functions in programmable logic to increase efficiency and throughput. This architectural combination gives an advantageous mix of serial and parallel processing, flexibility, and scalability, thereby enabling a more optimized system partitioning—especially in the areas of intelligent video, digital communications, machine systems, and medical devices.

Given the variety of options available to designers, a design may include several portions split between software and programmable logic of one or more integrated circuits. However, implementing a suitable arrangement for communication between different portions poses a challenge to designers. Data bus architectures provide a convenient method to communicate data between the various portions of a system. In a data bus architecture, one or more communication channels are shared by multiple devices. Communication on each channel is coordinated so that only one device communicates data on the channel at a given time. Data busses typically implement buffering of data. Buffering decouples the communication between devices from the processing of data. Through buffering, several data packets can be transmitted in a burst mode and buffered until the processing circuit is available.

Data busses may be implemented with a number of different data bus architectures such as the Peripheral Component Interconnect (PCI) and the Advanced Microcontroller Bus Architecture (AMBA) bus architectures. Designers typically implement interface circuits to communicate data to and from the data bus in a manner compliant with the chosen data bus protocol. However, because different cores and processors may communicate in different bit formats, implementation of interface circuitry can be challenging. The complexity of the interface circuitry may be further compounded if the data bus is to perform advanced communication functions not included in the base specification of the chosen data bus protocol.

The disclosed embodiments may address one or more of the above issues.

SUMMARY

In one embodiment, a method for implementing quality of service (QOS) processing in a data bus interface is provided. Each input read/write command is stored in a first-in-first-out queue. Each input read/write command includes a respective QOS value. In response to an input first read/write command having a QOS value higher than the QOS value of the read/write command at the head of the first-in-first-out queue, the QOS value of each of a first number of read/write commands is increased as each read/write command is removed from the head of the first-in-first-out queue.

In another embodiment, the increasing of the QOS value increases the QOS value to be equal to the QOS value of the input first read/write command.

In response to the input first read/write command having the QOS value higher than the QOS value of the read/write command at the head of the first-in-first-out queue, another embodiment includes decreasing the QOS value of the input first read/write command.

In another embodiment, one or more read/write commands, which are input subsequent to the input first read/write command, are stored in the first-in-first-out queue. In response to the input first read/write command having the QOS value higher than the QOS value of the read/write command at the head of the first-in-first-out queue, each respective QOS value of a second number of the one or more read/write commands, input subsequent to the input first read/write command, is decreased.

A number of read/write commands in the first-in-first-out queue are counted in another embodiment, and a value indicating the counted number of read/write commands in the first-in-first-out queue is output.

In another embodiment, the first number of the read/write commands is equal to a number of read/write commands preceding the input first read/write command in the first-in-first-out queue.

The first number of the one or more read/write commands appended with each respective increased QOS value is output on a data bus in another embodiment.

In another embodiment, input read/write commands are converted from a first command format into a second command format.

In another embodiment, the data bus interface facilitates transactions using separate control and data channels.

The storing of the input read/write commands in the first-in-first-out queue is controlled in a first clock domain in another embodiment, and the removal of each read/write command from the first-in-first-out queue is controlled in a second clock domain.

A data bus interface circuit is provided in another embodiment. A first-in-first-out (FIFO) command queue is coupled to receive and buffer read/write commands from a first input. A FIFO data queue is coupled to receive and buffer data packets from a second input. A quality-of-service QOS management circuit is coupled to the FIFO command queue and configured, in response to an input first read/write command, to compare a QOS value of the first read/write command to a QOS value of a read/write command stored at the head of the command queue. In response to the first read/write command having a QOS value higher than a QOS value of the read/write command stored at the head of the command queue, the QOS management circuit is configured to increase each QOS value of one or more commands, which precede the input first read/write command, as the command is removed from the command queue.

In response to the QOS value of the first read/write command having a value higher than the QOS value of the read/write command stored at the head of the command queue, the QOS management circuit of another embodiment is further configured to decrease each QOS value of one or more read/write commands received subsequent to the first read/write command.

In another embodiment, the one or more commands include all commands that precede the input first read/write command.

The data bus interface circuit is configured to operate in a first mode in another embodiment. While operating in the first mode, the QOS management circuit performs the operations of comparing and increasing in response to the data bus interface circuit receiving the first read/write command from the master device and contingent on the number of read/write commands buffered in the FIFO command queue being greater than a second number.

In another embodiment, the data bus interface channel controller circuit is configured to operate in a second mode. While operating in the second mode, the QOS management circuit sets a QOS value of each read/write command received to a selected value.

A command translation circuit couples the FIFO command queue to the first input in another embodiment. The command translation circuit is configured to convert the read/write commands received from the first input from a first format to a second format.

In another embodiment, an article of manufacture is provided. The article includes a non-transitory processor-readable storage medium configured with configuration data that, when loaded onto a programmable integrated circuit, cause a set of programmable elements to operate as a data bus interface configured to implement quality of service (QOS). The data bus interface performs operations including storing each input read/write command into a first-in-first-out queue. Each input read/write command has a respective QOS value. In response to an input first read/write command having a QOS value higher than the QOS value of the read/write command at the head of the first-in-first-out queue, the data bus interface increases the QOS value of each of a first number of read/write commands as each read/write command is removed from the head of the first-in-first-out queue.

In another embodiment, the increasing of the QOS value increases the QOS value to be equal to the QOS value of the input first read/write command.

The data bus interface, in another embodiment, in response to the input first read/write command having the QOS value higher than the QOS value of the read/write command at the head of the first-in-first-out queue, decreases the QOS value of the input first read/write command.

In another embodiment, the data bus interface stores in the first-in-first-out queue, one or more read/write commands input subsequent to the input first read/write command. In response to the input first read/write command having a QOS value higher than the QOS value of the read/write command at the head of the first-in-first-out queue, the data bus interface decreases each respective QOS value of a second number of the one or more read/write commands input subsequent to the input first read/write command.

It will be appreciated that various other embodiments are set forth in the Detailed Description and Claims, which follow.

BRIEF DESCRIPTION OF THE DRAWINGS

Various aspects and advantages of the disclosed embodiments will become apparent upon review of the following detailed description and upon reference to the drawings, in which.

DETAILED DESCRIPTION

Data busses may be implemented using a number of standard data bus architectures. In many instances, an application may require advanced communication functions not implemented by a selected architecture. One advanced function provides the ability to assign different priority to different segments of data in order to achieve a desired quality of service (QOS). The assigned priority can be used to schedule or prioritize communication over the data bus and/or processing of the data segments. The embodiments described herein provide a method and circuit for achieving the desired QOS in a data bus interface.

The embodiments may be used to implement QOS processing in a manner compliant with a number of data bus architectures. For ease of explanation, the following embodiments and illustrative examples are described with reference to the Advanced Microcontroller Bus Architecture (AMBA) Advanced Extensible Interface (AXI). AMBA AXI is a standardized protocol for communicating between master and slave devices on a data bus. Communication is implemented with separate address/control and data phases. Multiple outstanding read/write transactions may be issued and processed. The ability to issue multiple outstanding transactions allows multiple transactions to be issued in a burst mode where only the starting address of the read/write transaction is specified. The AMBA AXI protocol is fully described in the AMBA 3.0 specification.

Figure 1:
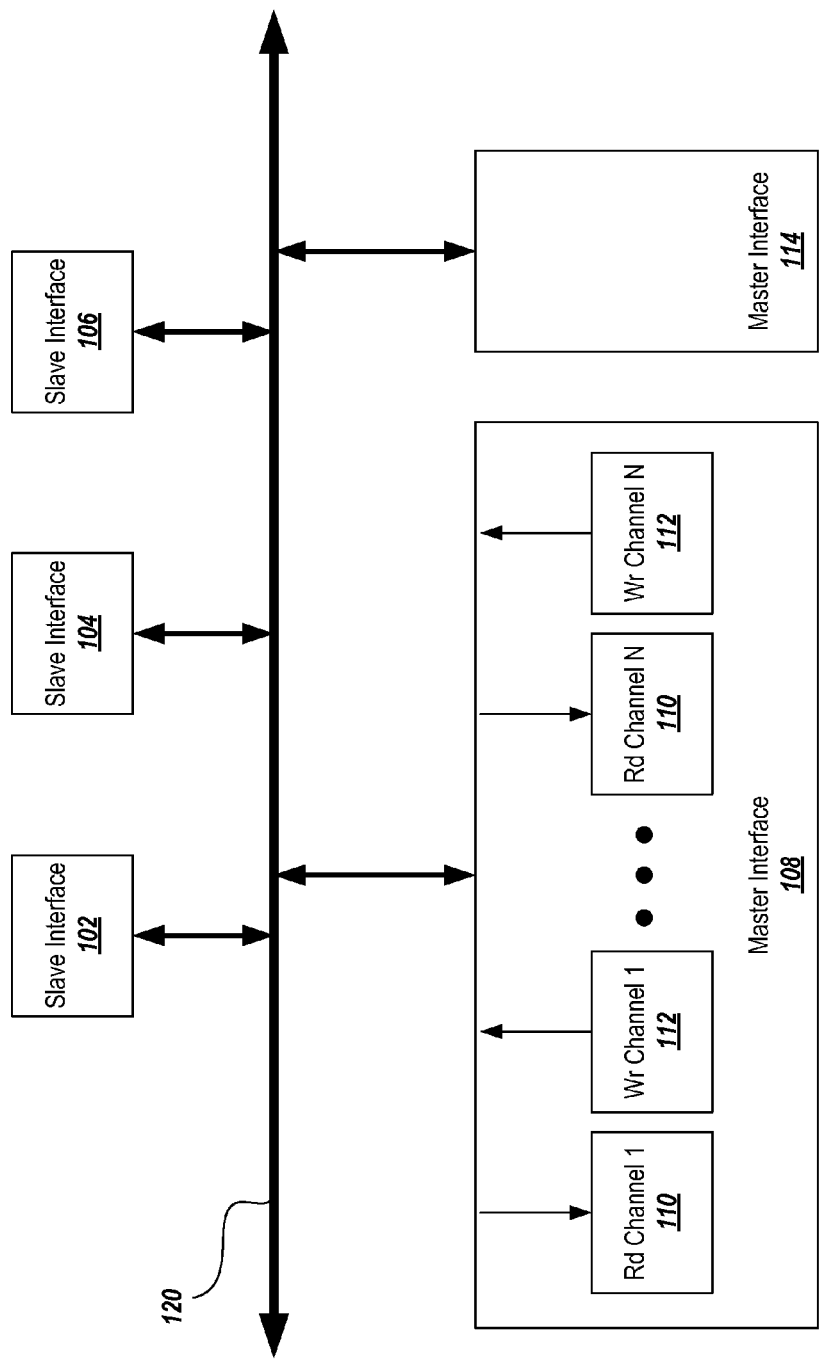
FIG. 1 shows a block diagram of an example AMBA AXI data bus.

FIG. 1 shows a block diagram of an example data bus implemented in accordance with AMBA AXI. In this example, slave data bus interfaces 102, 104, and 106 and master interfaces 108 and 114 are connected to data bus 120. Each interface communicates data between a device having a unique address (not shown) and the data bus 120. As shown in master interface 108, each interface circuit may implement a plurality of read and write channels 110 and 112.

Figure 2:
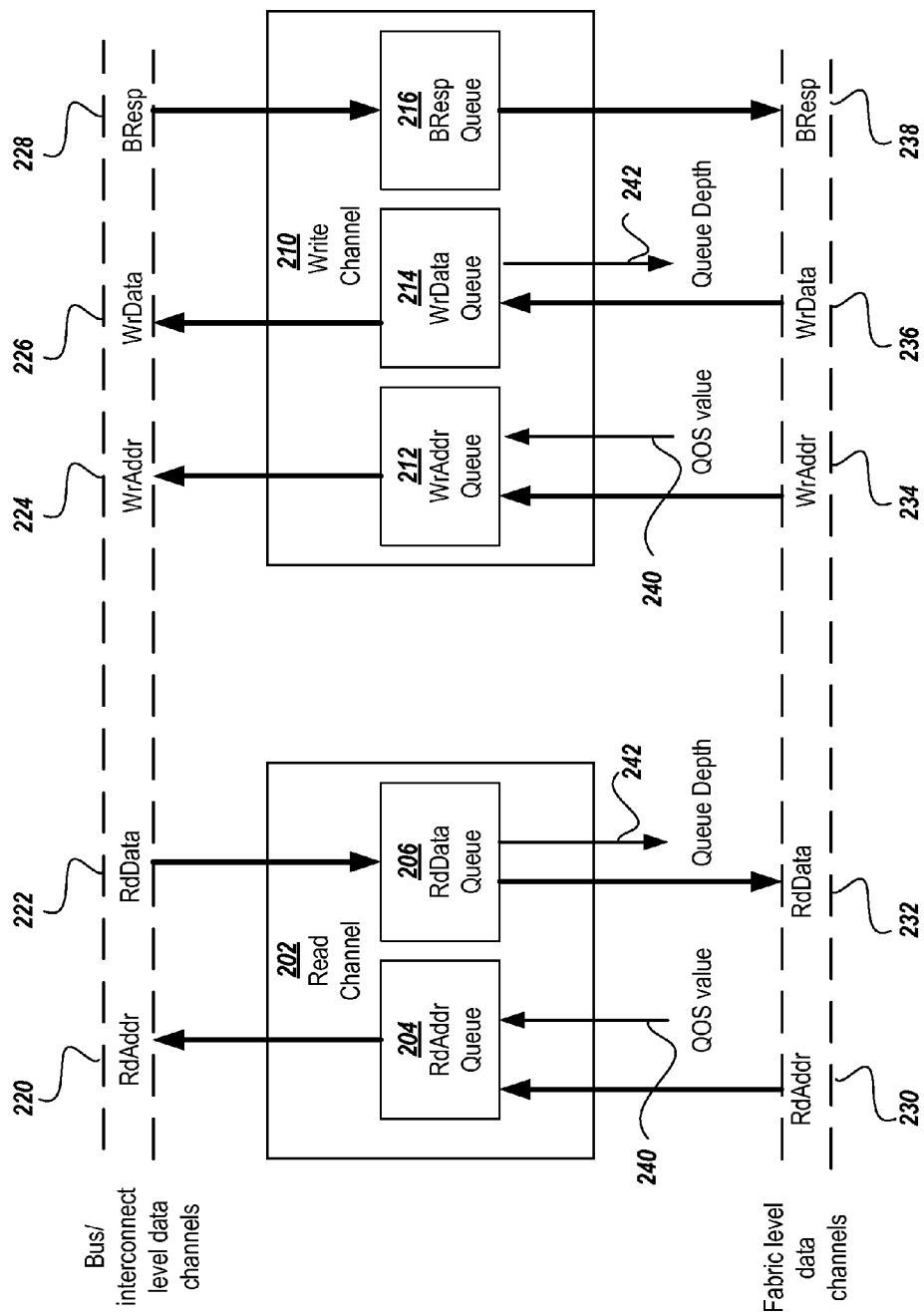
FIG. 2 shows a block diagram of an example master data bus interface circuit.

FIG. 2 shows a block diagram of an example master interface circuit for a data bus. In this example, the interface is configured with a read channel 202 and a write channel 210. The interface read channel 202 includes two first-in-first-out (FIFO) circuits (RdAddr Queue 204 and RdData Queue 206) for buffering received commands and data segments. Commands received from programmable IC fabric read channel 230 are buffered in read address ("RdAddr") queue 204. Processed read commands are transmitted on data bus interconnect RdAddr channel 220. Data block segments corresponding to issued commands are received from bus interconnect read data ("RdData") channel 222 and buffered in RdData queue 206. Queued data blocks are retrieved from RdData queue 206 on fabric level RdData channel 232.

The interface write channel 210 includes three FIFO circuits (WrAddr Queue 212, WrData Queue 214, and BResp Queue 216) for buffering received commands, data segments to be written, and response data received from slave devices. Commands and data segments received from programmable IC fabric write address ("WrAddr") and write data ("WrData") channels 234 and 236 are respectively buffered in WrAddr queue 212 and WrData queue 214. Processed write commands and data are respectively transmitted on data bus interconnect WrAddr channel 224 and WrData channel 226. Confirmation response data received on BResp channel 228 are buffered in BResp queue 216 and forwarded on programmable IC fabric channel BResp channel 238.

In this example, the read and write interface channels 202 and 210 are configured to receive QOS values 240 from the programmable IC fabric and output a status 242 indicating the current depth of the queues.

Implementing suitable controls over QOS may be difficult in data bus protocols, such as AMBA AXI, where transaction commands are buffered by each interface before they are communicated over the data bus. If a high priority command is preceded by several low priority commands in a command queue of the data bus interface, delay incurred in processing the low priority commands prior to processing the high priority commands may inhibit throughput required by the high priority command. Some implementations may reorder the command queue to communicate and process the queued commands out of order. However, this approach introduces a high level of complexity into the interface circuit and may result in incorrect processing of read and write transactions. The disclosed embodiments increase the priority of one or more low priority commands that precede a high priority command in the command queue. In this manner, the preceding commands can be processed with a high priority, reducing the delay incurred prior to processing the high priority command.

Figure 3:
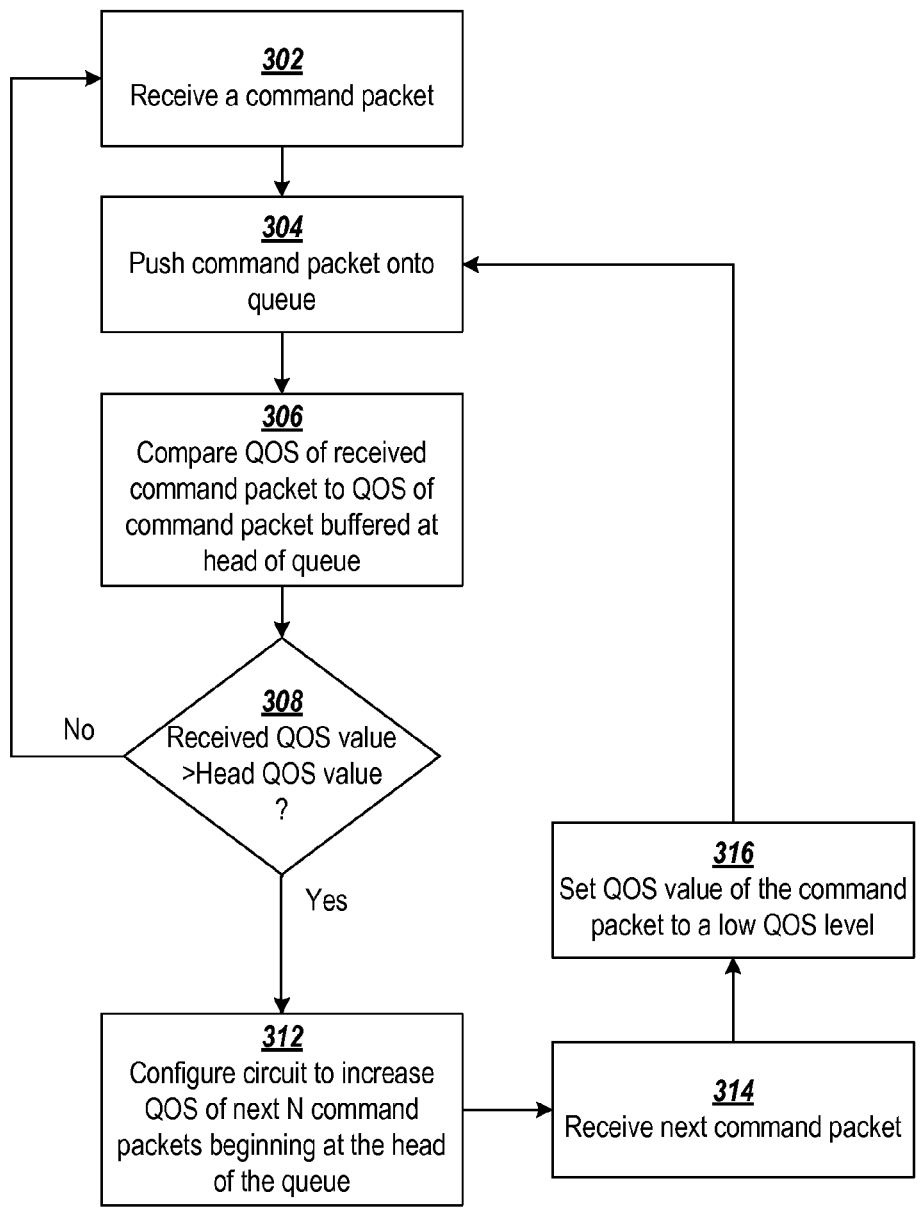
FIG. 3 shows a flowchart of a process for implementing QOS in a data bus interface in accordance with one embodiment.

FIG. 3 shows a flowchart of a method for controlling QOS in a data bus interface. A command packet is received by the data bus interface at step 302. The command packet is pushed into the command queue at step 304. The QOS indicator of the command packet received at step 302 is compared to the QOS value of a command packet located at the head of the command queue at step 306. In response to the QOS value of the received command packet being greater that the QOS value of the command packet at the head of the command queue (decision step 308), the data bus interface is configured to increase the QOS value of a selected number (N) of commands beginning at the head of the queue at step 312. In one implementation, the selected number is equal to the number of queued commands preceding the high priority QOS command received at step 302. In other implementations, the selected number may be less than the number of commands preceding the high priority command and chosen based on the number of queued commands and the QOS value of the high QOS command received at step 302.

Increasing the QOS values of preceding commands may prevent other master interfaces from communicating over the data bus while the preceding commands are being transmitted. During this period the number of commands queued by other master interfaces may become quite large. In one embodiment, in order to allow the other master interfaces to obtain control of the data bus, the priority is decreased for one or more commands following the high priority command received at step 302. As illustrated in FIG. 3, the next command packet is received at step 314. The QOS value of the command packet received at step 314 is set to a low QOS value at step 316. The command packet is then pushed into the queue at step 304. If the QOS value of the received command packet is less than or equal to that of the QOS value of the command packet at the head of the command queue (decision step 308), the next command packet is received at step 302 and pushed into the command queue at step 304, and the process continues with each received command packet.

Figure 4:
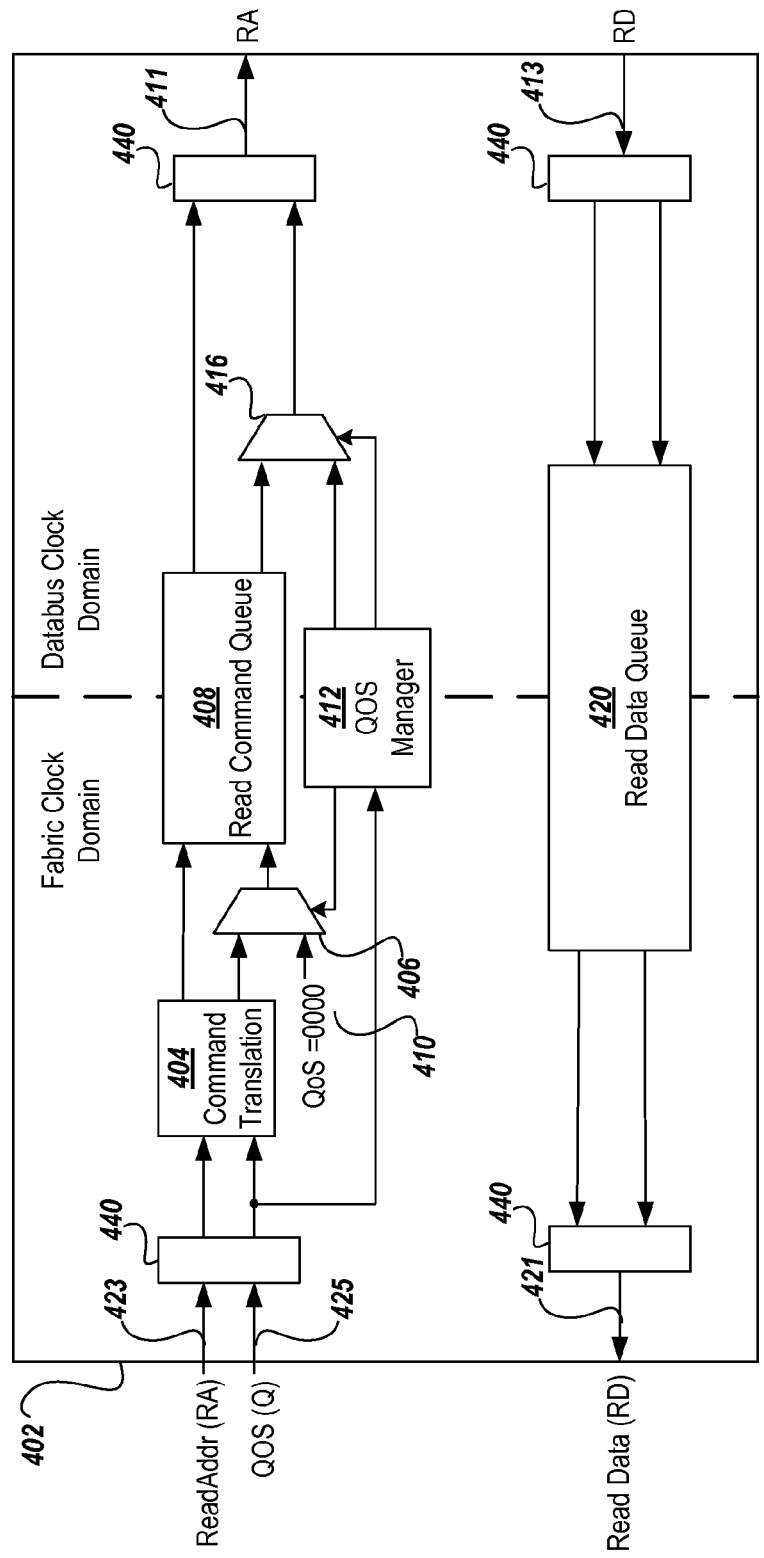
FIG. 4 shows a block diagram of an example circuit for implementing an AMBA AXI data bus interface read channel circuit with QOS in accordance with one embodiment.

FIG. 4 shows a block diagram of an example circuit 402 for implementing a data bus interface read channel circuit with QOS control in accordance with one embodiment. In this example, queued commands and data are asynchronously clocked between fabric and data bus clock domains. Register slices 440 are included for retiming input and output. One skilled in the art will recognize that a write channel and/or synchronous operations may be implemented in a manner similar to that shown in FIG. 4.

Commands are received from the programmable IC fabric read address (RA) channel 423. A QOS value 425 is also received from the programmable IC fabric. A command translation circuit 404, as shown, may be included to convert received commands from a first format used by the programmable IC fabric to a second format used by the data bus. For example, the programmable IC fabric and data bus channels may be different bit-widths. In one implementation, the QOS value may be included in the command received from the RA channel. An asynchronous read command queue 408 is coupled to receive translated commands from the CMD translation circuit 404. A QOS manager circuit 412 is coupled to receive the QOS value of each received command. The QOS manager circuit 412 is configured to compare the received QOS value to the QOS value of the command at the head of the command queue. As described above, if the QOS value of the received command is higher than the QOS value of the command at the head of the queue, the QOS manager circuit 412 is configured to use multiplexer 416 to replace the QOS value(s) of a selected number of commands output from queue 408 prior to transmitting the command over the data bus read address (RA) channel 411. Data segments received on read data (RD) channel 413 in response to transmitted read commands are buffered by asynchronous read data queue 420. Data segments buffered in queue 420 are made available to the programmable IC on the RD channel 421 of the programmable IC fabric.

As described above, the QOS manager circuit 412 is configured to replace the QOS value(s) of a number of subsequently received commands in response to the QOS value of the received command being higher than the QOS value of the command at the head of the queue. In this implementation, the multiplexer 406 replaces the QOS value(s) of the number of subsequent commands with a replacement QOS value 410. The QOS value 410 may be a fixed value or may be a value selected based on a number of factors such as the QOS value of the subsequently received command, the number of commands buffered by asynchronous read data queue 420, the number of outstanding transactions, etc.

In one embodiment, the interface is configured to operate in a number of modes. In a first mode, the QOS manager is configured to disable QOS control by setting the QOS value of each command received to a low value. In a second mode, the QOS manager modifies the QOS value(s) as described above. In one implementation, the QOS manager is configured to operate in the second mode when the number of queued commands exceeds an application dependent threshold. In another embodiment, the QOS manager is configured to increase the QOS values of queued commands automatically when the number of queued commands exceeds a selected threshold.

Those skilled in the art will appreciate that various alternative circuit arrangements, including circuitry to fully implement features of the chosen database architecture protocol, could be used to perform the processes of the different embodiments described herein.

Figure 5:
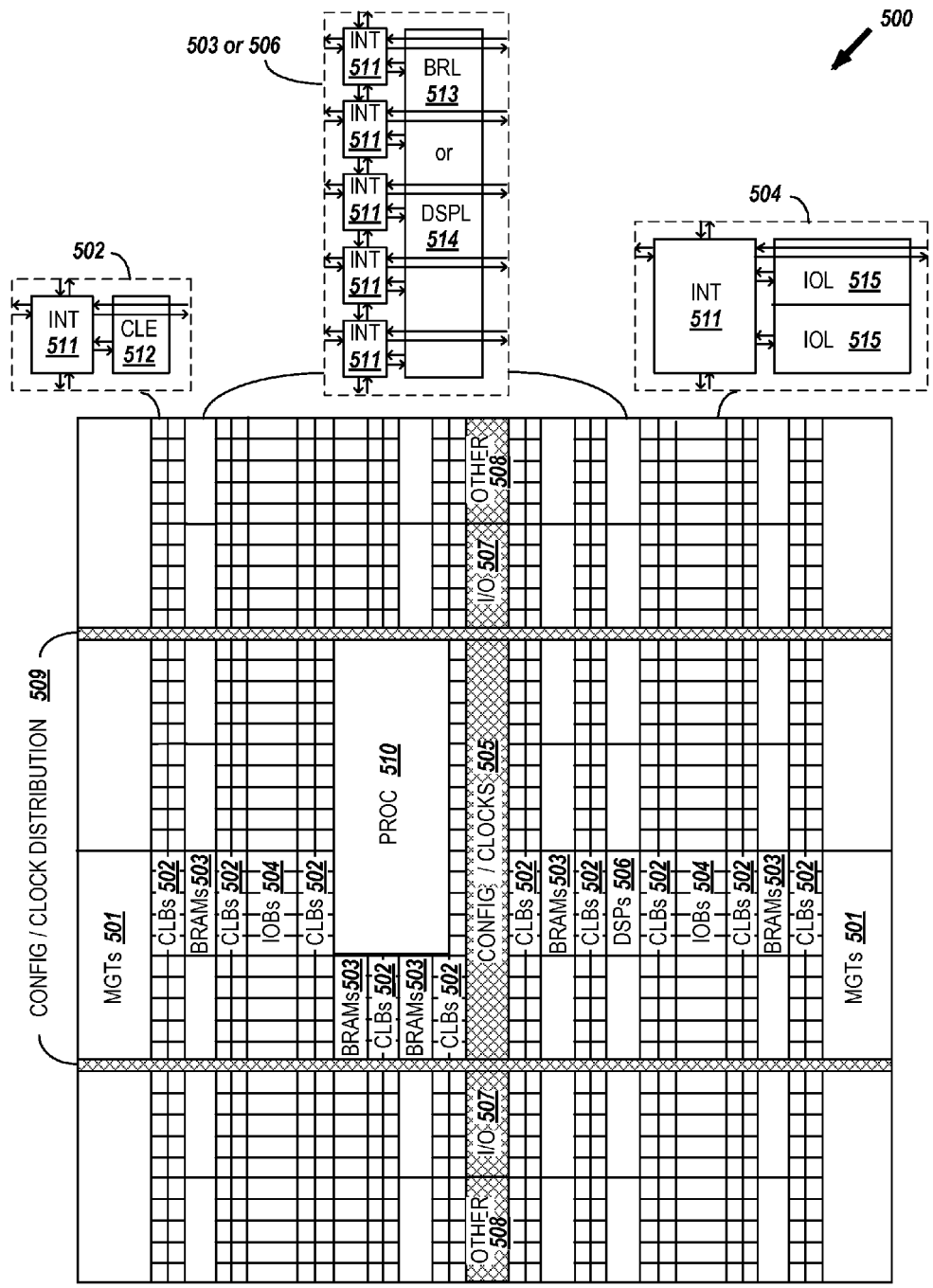
FIG. 5 shows a circuit diagram of an example programmable logic integrated circuit that may be configured to implement one of more data bus interfaces in accordance with one or more embodiments.

FIG. 5 is a block diagram of an example FPGA that may be configured to implement one or more data bus interface circuits in accordance with one or more embodiments. The data bus interface circuits may be implemented in programmable logic or using dedicated hardware. FPGAs can include several different types of programmable logic blocks in the array. For example, FIG. 5 illustrates an FPGA architecture (500) that includes a large number of different programmable tiles including multi-gigabit transceivers (MGTs 501), configurable logic blocks (CLBs 502), random access memory blocks (BRAMs 503), input/output blocks (IOBs 504), configuration and clocking logic (CONFIG/CLOCKS 505), digital signal processing blocks (DSPs 506), specialized input/output blocks (I/O 507), for example, clock ports, and other programmable logic 508 such as digital clock managers, analog-to-digital converters, system monitoring logic, and so forth. Some FPGAs also include dedicated processor blocks (PROC 510).

In some FPGAs, each programmable tile includes a programmable interconnect element (INT 511) having standardized connections to and from a corresponding interconnect element in each adjacent tile. Therefore, the programmable interconnect elements taken together implement the programmable interconnect structure for the illustrated FPGA. The programmable interconnect element INT 511 also includes the connections to and from the programmable logic element within the same tile, as shown by the examples included at the top of FIG. 5.

For example, a CLB 502 can include a configurable logic element CLE 512 that can be programmed to implement user logic plus a single programmable interconnect element NT 511. A BRAM 503 can include a BRAM logic element (BRL 513) in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 506 can include a DSP logic element (DSPL 514) in addition to an appropriate number of programmable interconnect elements. An IOB 504 can include, for example, two instances of an input/output logic element (IOL 515) in addition to one instance of the programmable interconnect element INT 511. As will be clear to those of skill in the art, the actual I/O pads connected, for example, to the I/O logic element 515 are manufactured using metal layered above the various illustrated logic blocks, and typically are not confined to the area of the input/output logic element 515.

In the pictured embodiment, a columnar area near the center of the die (shown shaded in FIG. 5) is used for configuration, clock, and other control logic. Horizontal areas 509 extending from this column are used to distribute the clocks and configuration signals across the breadth of the FPGA.

Some FPGAs utilizing the architecture illustrated in FIG. 5 include additional logic blocks that disrupt the regular columnar structure making up a large part of the FPGA. The additional logic blocks can be programmable blocks and/or dedicated logic. For example, the processor block PROC 510 shown in FIG. 5 spans several columns of CLBs and BRAMs.

Note that FIG. 5 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 5 are purely exemplary. For example, in an actual FPGA more than one adjacent column of CLBs is typically included wherever the CLBs appear, to facilitate the efficient implementation of user logic.

Those skilled in the art will appreciate that various storage devices may be suitable for storing configuration data for implementing the operations and structures described herein on a programmable integrated circuit. Such storage devices are processor readable, and programmable elements of the IC when programmed with the configuration data, operate consistent with the processes described herein. Other alternative embodiments may include a computing arrangement, including one or more processors and a memory arrangement configured with program code, would be suitable for hosting the processes and data structures of the different embodiments of the present invention.

The disclosed embodiments are thought to be applicable to a variety of applications utilizing data bus communication. Other aspects and embodiments will be apparent to those skilled in the art from consideration of the specification and practice of the embodiments disclosed herein. It is intended that the specification and illustrated embodiments be considered as examples only, with a true scope and spirit of the invention being indicated by the following claims.

What is claimed is:

1. A method for implementing quality of service (QOS) processing in a data bus interface, the method comprising:

storing a plurality of input read/write commands into a first-in-first-out queue, each input read/write command being one of a read command or a write command and having a respective QOS value;

in response to one of the input read/write commands being an input read command and having a QOS value higher than the QOS value of one of the input read/write commands at a head of the first-in-first-out queue, in each read command and each write command of a first number of read/write commands that precede the input read command in the first-in-first-out queue, increasing the QOS value of each read command and each write command as each read command and each write command is removed from the head of the first-in-first-out queue;

in response to one of the input read/write commands being a write command and having a QOS value higher than the QOS value of one of the input read/write commands at the head of the first-in-first-out queue, in each read command and each write command of the first number of read/write commands that precede the input write command in the first-in-first-out queue, increasing the QOS value of each read command and each write command as each read command and each write command is removed from the head of the first-in-first-out queue;

storing, in the first-in-first-out queue, one or more read/write commands input subsequent to the one of the input read/write commands; and in response to the one of the input read/write commands having the QOS value higher than the QOS value of the read/write command at the head of the first-in-first-out queue, decreasing each respective QOS value of a second number of the one or more read/write commands input subsequent to the one of the input read/write commands.

2. The method of claim 1, wherein the increasing of the QOS value increases the QOS value to be equal to the QOS value of the one of the input read/write commands.

3. The method of claim 1, further comprising, in response to the one of the input read/write commands having the QOS value higher than the QOS value of the read/write command at the head of the first-in-first-out queue, decreasing the QOS value of the one of the input read/write commands.

4. The method of claim 1, further comprising:
counting a number of read/write commands in the first-in-first-out queue; and
outputting a value indicating the counted number of read/write commands in the first-in-first-out queue.

5. The method of claim 1, wherein the first number of the read/write commands is equal to a number of read/write commands preceding the one of the input read/write commands in the first-in-first-out queue.

6. The method of claim 1, further comprising outputting each read/write command of the first number of the one or more read/write commands along with each increased QOS value on a data bus.

7. The method of claim 1, further comprising converting the one of the input read/write commands from a first command format into a second command format.

8. The method of claim 1, wherein the data bus interface facilitates transactions using separate control and data channels.

9. The method of claim 1, wherein the storing of the input read/write commands in the first-in-first-out queue is controlled in a first clock domain, and the removal of each read/write command from the first-in-first-out queue is controlled in a second clock domain.

10. A data bus interface circuit, comprising:
a first-in-first-out (FIFO) command queue coupled to receive and buffer read/write commands from a first input, each read/write command being one of a read command or a write command and having a respective quality-of-service (QOS) value;
a FIFO data queue coupled to receive and buffer data packets from a second input; and
a QOS management circuit coupled to the FIFO command queue and configured, in response to each one of the input read/write commands, to perform operations including:
comparing a QOS value of the one of the input read/write commands to a QOS value of a read/write command stored at a head of the command queue;
in response to the one of the input read/write commands being an input read command and having a QOS value higher than a QOS value of one of the read/write commands stored at a head of the command queue, in each read command and each write command of a first number of read/write commands that precede the input read command in the command queue, increasing each QOS value of each read command and each write command as each read command and each write command is removed from the command queue;
in response to the one of the input read/write commands being an input write command and having a QOS value higher than a QOS value of one of the read/write commands stored at a head of the command queue, in each read command and each write command of the first number of read/write commands that precede the input write command in the command queue, increasing each QOS value of each read command and each write command as each read command and each write command is removed from the command queue; and in response to the QOS value of the one of the input read/write commands having a value higher than the QOS value of the one of the read/write commands stored at the head of the command queue, decreasing each QOS value of one or more read/write commands received subsequent to the one of the input read/write commands.

11. The data bus interface circuit of claim 10, wherein the first number of read/write commands includes all commands that precede the input first read/write command.

12. The data bus interface circuit of claim 11, wherein:
the data bus interface circuit is configured to operate in a first mode; and
while operating in the first mode, the QOS management circuit performs the operations of comparing and increasing in response to the data bus interface circuit receiving the one of the input first read/write commands from a master device and contingent on the number of read/write commands buffered in the FIFO command queue being greater than a second number.

13. The data bus interface circuit of claim 12, wherein:
the data bus interface circuit is configured to operate in a second mode; and
while operating in the second mode the QOS management circuit sets a QOS value of each read/write command received to a selected value.

14. The data bus interface circuit of claim 10, further comprising a command translation circuit coupling the FIFO command queue to the first input and configured to convert the read/write commands received from the first input from a first format to a second format.

15. An article of manufacture, comprising:
a non-transitory processor-readable storage medium configured with configuration data that when loaded onto a programmable integrated circuit (IC), cause a set of programmable elements to operate as a data bus interface, the data bus interface configured to implement quality of service (QOS) by performing operations including:
storing a plurality of input read/write commands into a first-in-first-out queue, each input read/write command being one of a read command or a write command and having a respective QOS value;
in response to one of the input read/write commands being an input read command and having a QOS value higher than the QOS value of one of the input read/write commands at a head of the first-in-first-out queue, in each read command and each write command of a first number of read/write commands that precede the input read command in the first-in-first-out queue, increasing the QOS value of each read command and each write command as each read command and each write command is removed from the head of the first-in-first-out queue;
in response to one of the input read/write commands being a write command and having a QOS value higher than the QOS value of one of the input read/write commands at the head of the first-in-first-out queue, in each read command and each write command of the first number of read/write commands that precede the input write command in the first-in-first-out queue, increasing the QOS value of each read command and each write command as each read command and each write command is removed from the head of the first-in-first-out queue;

storing, in the first-in-first-out queue, one or more read/write commands input subsequent to the one of the input read/write commands; and in response to the one of the input read/write commands having the QOS value higher than the QOS value of the one of the read/write commands at the head of the first-in-first-out queue, decreasing each respective QOS value of a second number of the one or more read/write commands input subsequent to the one of the input first read/write commands.

16. The article of manufacture of claim 15, wherein the increasing of the QOS value increases the QOS value to be equal to the QOS value of the one of the input read/write commands.

17. The article of manufacture of claim 15, wherein the data bus interface further decreases, in response to the one of the input read/write commands having the QOS value higher than the QOS value of the one of the read/write commands at the head of the first-in-first-out queue, the QOS value of the one of the input first read/write commands.

* * * * *